May 22, 1973 F. SCHILLING 3,734,827

NUCLEAR-REACTOR STRUCTURE

Filed Jan. 5, 1970 3 Sheets-Sheet 1

INVENTOR.
FRANZ SCHILLING
BY Karl G. Ross
ATTORNEY

United States Patent Office 3,734,827
Patented May 22, 1973

3,734,827
NUCLEAR-REACTOR STRUCTURE
Franz Schilling, Kempen, Rhineland, Germany, assignor to Siempelkamp Giesserei KG, Krefeld, Germany
Filed Jan. 5, 1970, Ser. No. 780
Int. Cl. G21c 13/08
U.S. Cl. 176—87     12 Claims

ABSTRACT OF THE DISCLOSURE

A nuclear-reactor structure in which the reactor core is housed in a metallic enclosure serving in part as a pressure vessel and at least in part as a radioactive shield. The walls of the structure are made up of prestressed cast-iron bodies which may have interfitting or interlocking formations with any gaps filled by pressure-retaining compounds. Stressing may be effected by rods or cables running through the cast-iron elements or by externally positioned cables, wires, bands or rings.

FIELD OF THE INVENTION

The present invention relates to nuclear reactor structures and, more particularly, to enclosures for nuclear-reactor cores which must retain pressure.

BACKGROUND OF THE INVENTION

While numerous nuclear-reactor systems have been proposed in recent years, some are characterized by the pressure retention of the enclosure for the reactor core which sustains self-propagating nuclear reactions, generally generating a neutron flux which continues the chain reaction and may be used to breed nuclear reactor fuels, to irradiate sensitizable materials for isotopic labelling, to produce radioactive materials, to bring about chemical transformation, etc., to generate thermal energy for a variety of purposes and/or to produce electrical energy, generally via a nuclear-thermal transformation.

Among the nuclear reactors which have been described in the literature and have been known heretofore are those which operate under pressure, i.e. are contained within a pressure-retaining vessel, and include pressurized-water reactors in which heavy water or ordinary water constitute moderating or cooling media. Boiling-water reactors are also included in this category as are high-pressure gas reactors.

In general, the enclosures for such reactors are concrete shells in which the concrete forms a relatively thick radiation shield or absorbing medium, generally provided with reinforcement sheaths of steel or the like for structural, sealing or insulation purposes. Such systems are, of course, expensive, not only because the concrete enclosure must be extremely thick to perform its radiation-absorbing function, but because the structure must also be able to withstand the considerable stress developed in such reactors. On the one hand, for example, the internal pressure may vary within wide ranges while the external pressure remains at the ambient level thereby exposing the enclosure to tensile stresses which may even vary from place to place along the enclosure walls, depending upon the configuration of the enclosure and the cross-section of the walls. On the other hand, the temperature differential across the walls from the interior of the reactor housing to the ambient temperature creates thermal stress and even results in physical and chemical changes within the concrete of the enclosure which leads to deterioration of the later. Furthermore the exposure of the concrete to radioactive energy in the form of neutron, gamma ray or other high-velocity and high-energy flux, gives rise to chemical deterioration through dehydration of the enclosure walls. Finally additional stresses are created when the walls must be cooled by passing a coolant, generally water, through channels provided therein.

To overcome these disadvantages, various techniques of concrete construction have been employed generally using prestressing or reinforcing methods in which the concrete body is prestressed prior to internal loading so that, under the operating conditions of the reactor, the net stress at any particular point of the structure is held to a minimum. It has also been proposed to make use of laminate or multi-shell construction in which, instead of a monolithic massive or thick wall the wall is built up from a plurality of layers with the inner layers being especially designed to have reduced deterioration upon exposure to heat and radioactive energy, while thicker outer shells provide the structural and static requirements of the system. It will be recognized that such multi-layer construction is highly expensive and often unsatisfactory, especially when larger reactors are to be enclosed and frequently results in systems where the major part of the load-carrying capacity of the enclosure is consumed in supporting its own weight.

OBJECTS OF THE INVENTION

It is, therefore, the principal object of the present invention to provide a nuclear-reactor structure having an improving pressure-retentive enclosure in which the deterioration of the enclosure is less of a problem than heretofore and the structure is of reduced cost and possesses fewer static and structural problems than prior-art systems.

It is a more specific object of the invention to provide a pressure-retentive enclosure for pressurized-water, boiling-water and pressurized-gas nuclear reactors, with improved radiation shielding, reactor cooling, and resistance to radiation and thermal stress.

It is another object of the instant invention to provide an improved method of enclosing a nuclear reactor wherein some of the aforementioned disadvantages of prior art systems can be obviated.

SUMMARY OF THE INVENTION

The above objects and others which will become apparent hereinafter are attained, in accordance with the present invention, in a nuclear-reactor enclosure which serves simultaneously as a radiation shield and as the pressure-retaining vessel for a reactor core operating under elevated pressure.

It has been found, most surprisingly, that when the wall of a nuclear-reactor enclosure is constituted of cast iron, and means is provided to prestress the structural elements of cast iron making up the enclosure, a relatively thin wall (by comparison with the concrete walls used heretofore) can serve both as pressure-retaining means and as radiation-shielding means, preferably to the point that no shielding external of these walls is required.

According to the method aspects of the present invention, a nuclear-reactor core for a pressurized-water reactor, a boiling-water reactor, a swimming-pool reactor or a pressurized-gas reactor, is enclosed within a hermetically sealed vessel consisting of a base slab and a wall structure mounted upon the slab and hermetically enclosing the core except for those openings which must be provided to afford access to the core. The walls, base slab and, if necessary, a separate roof slab, may be cast monolithically from iron, in accordance with the principles of the present invention, especially in the case of relatively small reactors, or each may be precast and assembled at the site of the reactor, the wall structure being mounted upon the base slab and the roof structure being mounted upon the wall structure with suitable cranes or lifting means. More generally, however, each of the basic elements of the structure, namely the base slab, the wall structure and the roof structure, will be composed of a plurality of precast, generally segmental or sector-shaped building-block elements of cast iron which are fitted together at the site to form the basic structural elements, the assembly being prestressed by elongated members running through the cast-iron elements or engaging the exterior of the shell constructed therefrom.

To provide hermetic sealing, any gaps or junction zones between adjacent cast-iron elements can be filled with a cement or sealing composition, preferably of the pressure-retentive hardenable type as will become apparent hereinafter. While prestressing may be applied by any of the conventional means which have been developed in the reinforced concrete field, it is preferred, in connection with the present invention, to stress the structure by thermal means. Thus, the prestressing elements may be thermally contracted after being tightened with initial heating, to maintain the structures under an inner prestress, or else the cast-iron walls themselves may be expanded thermally, or by the generation of internal pressure to create an inwardly acting prestress.

As far as the structural aspects of the invention are concerned, it is to be noted that the walls of the vessel have a thickness which serves simultaneously to withstand the internally developed pressure within the reactor housing and as a radiation shielding. It is self-understood that the pressure vessel must be provided with the openings customary for the type of reactor core enclosed by the housing, for example for the introduction and removal of water under pressure, the introduction of fissionable-fuel elements or for the insertion or removal of reaction-control rods.

When reference is made herein to a wall thickness which is capable of effecting the radiation shielding required for the reactor, it is to be understood that the cast-iron elements of the wall of the present invention will absorb at least the major part of the radiation passing outwardly from the reactor core and generally will provide substantially all of the shielding which is desirable. The vessel thus cannot merely be designated a pressure vessel, but must be described as a pressure shielding vessel in order to correctly designate its function. Of course, this is not to exclude the use of additional shielding materials as may be required or desirable and, for example, a water jacket or a concrete shell may be provided around the cast-iron enclosure to act as further radiation shielding means.

The prestressing of the system is so established that the cast-iron elements are able to withstand the internally developed pressures up to the catastrophe level, i.e. the output pressure developed should the reactor go critical and become decontrolled. Hence the inwardly directed prestress will generally be greater than the normally developed outward pressure.

The prestressing means and techniques may, as noted earlier, be derived from the art of prestressing concrete although certain modifications should be introduced as will be apparent hereinafter. The vessel may, of course, have any plan configuration, i.e. can be square, rectangular, circular or oval and may have any vertical section including the latter configurations, as may be required by the configuration of the reactor core. However, it has been found advantageous to constitute the structure from prefabricated cast-iron elements including a base plate, a cover plate and a wall structure in the form of cylinder segments or cylindrical rings, the latter being assembled one upon another. Each of the elements or the entire structure may be composed of relatively small structural units, preferably building-block elements of cast iron having complementary configurations so as to be mutually interfitting.

In a preferred embodiment of this invention, at least the bottom plate or base and the cover, or one of them, is composed of segmental building-block cast iron elements which are hollow and may be filled with radiation shielding material and/or thermally insulating materials and/or a cooling medium as may be required. When the base plate or the roof plate is to be prefabricated, as may be desired from time to time, it is possible to make use of so-called steel concrete, i.e. prefabricated reinforced concrete having a high proportion of steel reinforcing members traversing the body. There is, however, some disadvantage to be found in using steel concrete roof and floor slabs in plates of the preferred cast iron bodies described earlier.

In any event, the cylindrical wall structure of the vessel, between the floor and roof slabs, is composed of cylindrical rings or segments of cast iron with the gaps, crevices and joints between the elements being mutually staggered as in masonry construction and being filled or sealed with a hardenabel pressure-retaining composition, e.g. a metal-powder-filled synthetic resin of the high temperature epoxy type. Furthermore, for structural and shielding reasons, the joints between the elements of the wall structure are formed with interfitting male and female members constituting complementary formations having flanks generally transverse to the radial direction of propagation of the radioactive energy. Tongue and groove, dovetail or other similar points may be used for this purpose.

The prestressing of the structure may be brought about, in accordance with the invention, by providing channels within the cast-iron elements, through which elongated prestressing members, e.g. wires, cables or rods, may extend to anchors on opposite sides of the structure.

In addition, or in the alternative, the prestressing elements may be applied along the exterior of the vessel, e.g. in the form of a series of hoops, helical cable turns or the like inwardly prestressing the structure in the circumferential sense.

Preferably, however, the prestressing means includes steel rings which are shrunk onto the structure, the prestress being generated by shrinkage force. Advantageously, the steel rings are composed of band steel and are assembled in sections by welding at V-section joints. The vessel may also be prestressed by, for example, introducing a cool fluid into the channels provided in the vessel or the space enclosed thereby, thus shrinking the entire structure while the stressing members are tightened. Upon removal of the cooling fluid and normal expansion of the cast-iron bodies the stressing elements apply the desired degree of the prestress to the structure. Also, it is possible to assemble the cast-iron elements with the prestressing members in a slack condition and thereafter bring them under tension by pressurizing the vessel outwardly, i.e. by increasing the pressure within the space enclosed by the cast-iron element in the manner of inflation of a flexible structure.

It will be evident that cooling is seldom a problem with a vessel of the type contemplated by the present invention because of its uniformly high thermal conductivity throughout the metallic portions of this structure. In fact, it is advantgeous not to cool the metallic members, inasmuch as the thermal expansion thereof with increasing heat, generally accompanied by increasing pressure within the structure, corresponds to an increase in the prestress with which the cast-iron elements are held. Notwithstanding these factors, it is evident that cooling channels may be provided where required in the cast-iron elements and conventional circulating means may be used to pass cooling fluids through these channels. As a cooling fluid, there may be used moderating material and/or radiation-reflecting media so that the shielding effect of the vessel may be accompanied by neutron energy moderation and protection against thermal neutron diffusion loss.

According to an important aspect of this invention, the cast-iron elements of the nuclear reactor vessel are constituted of a cast-iron where the carbon concentration is in excess of about 3% by weight. While it has been recognized that, in organic media, the ratio of carbon atoms to other atoms of the molecule is a measure of the neutron cross section of the material, it has not been proposed heretofore that a pressure-retentive and shielding shell of cast iron may be adjusted to control the shielding characteristics by maintaning the carbon content of the cast iron above 3% and varying it in accordance with the desired degree of shielding. This feature is especially important when it is recognized that control of the carbon content of a cast iron is relatively simple and, therefore, that it is possible to regulate the shielding characteristics of a cast-iron pressure vessel so as to minimize the thickness of the walls thereof without loss of strength or overall shielding capability. Of course, it will be apparent from the above discussion that high carbon cast irons, i.e. those having elemental carbon precipitation within the lattice, and especially spherulitic cast iron may be employed to obtain the desired degree of shielding.

DESCRIPTION OF THE DRAWINGS

The above and other objects, features and advantages of the present invention will become more readily apparent from the following description, reference being made to the accompanying drawings in which.

SPECIFIC DESCRIPTION

Figure 1:
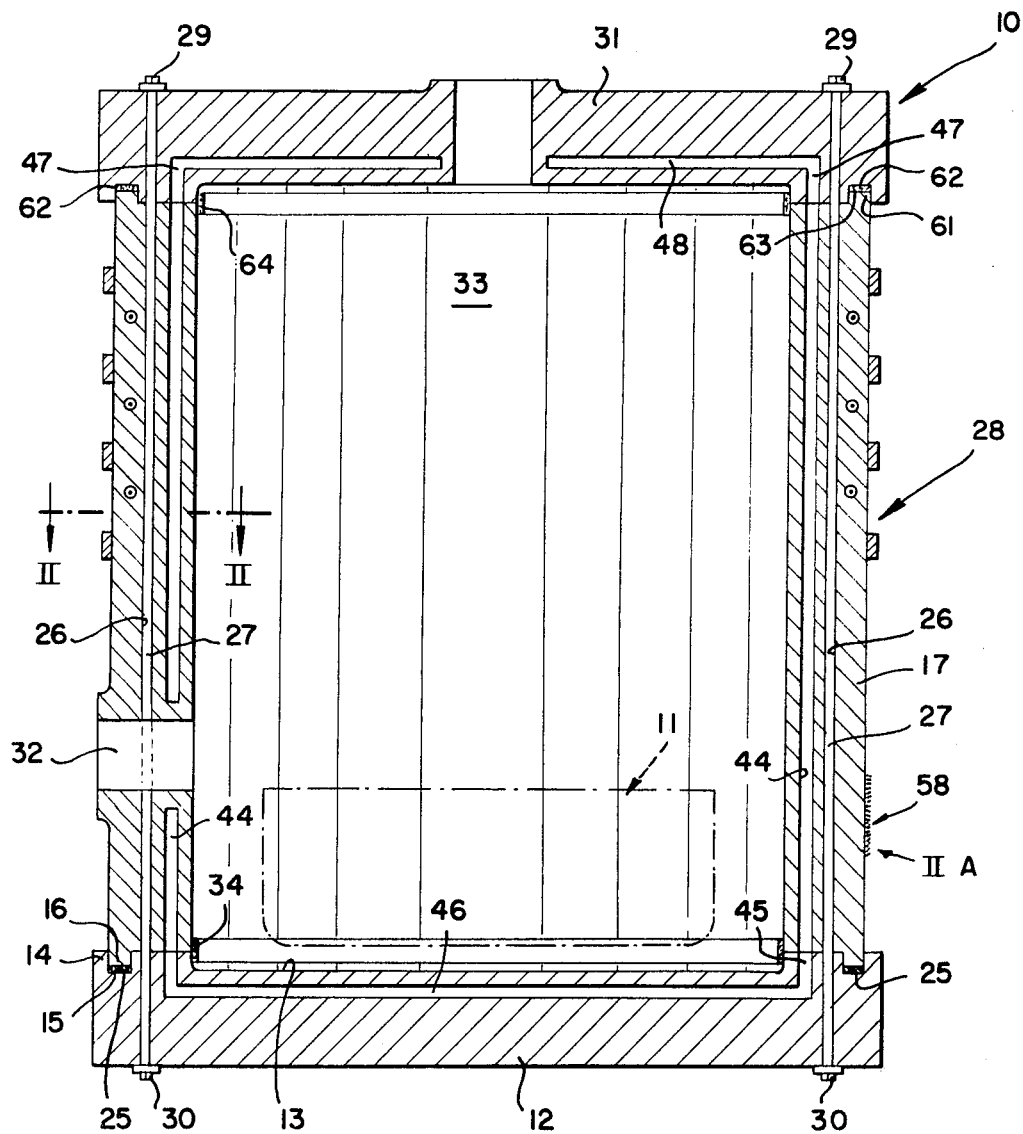
FIG. 1 is a vertical cross-sectional view through a cylindrical nuclear reactor shell according to the present invention.

The nuclear-reactor assembly illustrated in FIGS. 1, 2, 2A, 3 and 4 comprises a metallic pressure-retentive vessel 10 and a radioactive core 11 illustrated in dot-dash lines and representing substantially any conventional reactor core requiring a pressurizable enclosure.

According to the principles of the present invention, the monolithically cast cast-iron slab 12 constitutes a base plate for the structure and may be cast directly upon the usual foundation or prefabricated and moved to the construction site. The plate 12 is a circular disk provided with a circular hollow 13 in which the reactor core 11 is mounted and from which a circular sill 14 projects upwardly. The sill is formed with a channel 15 in which the tongues 16 of the cast-iron wall elements 17 and 24 are received, a sealing composition 25 of the pressure-retentive type filling the joint between the tongue and the groove. The pressure-retentive composition is a mixture of epoxy resin and its catalyst and iron particles with a high carbon content. In angular equispaced relationship along the sill 14, inwardly of the groove 15 and the tongues 16, there are provided in the base plate 12 a multiplicity of vertical passages 26 adapted to receive prestressing rods 27 designed to extend parallel to the generatrices of the cylindrical wall 28 formed by the cast-iron elements 17–24.

To prestress the structure in the vertical or axial sense, the prestressing rods 27 are provided with threaded ends engageable by nuts 29 and 30 designed to draw the roof plate 31 downwardly against the wall elements 17–24 and the sill 14 of the base plate 12. The base plate may, however, be composed of reinforced concrete (so-called steel concrete) as noted earlier. The wall elements 17–24 may be provided with radial passages 32, sealable by conventional locks, to admit fluids to the reactor chamber 33, remove fluids from the chamber, supply fuel elements, manipulate control rods, etc.

Figure 2A:
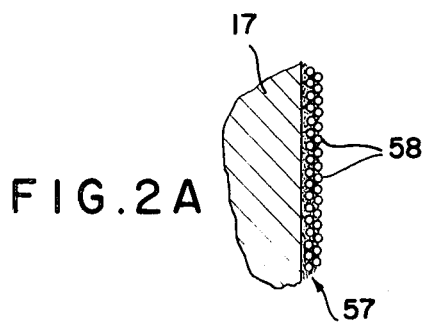
FIG. 2A is an enlarged section of the portion IIA of FIG. 1.
Figure 2:
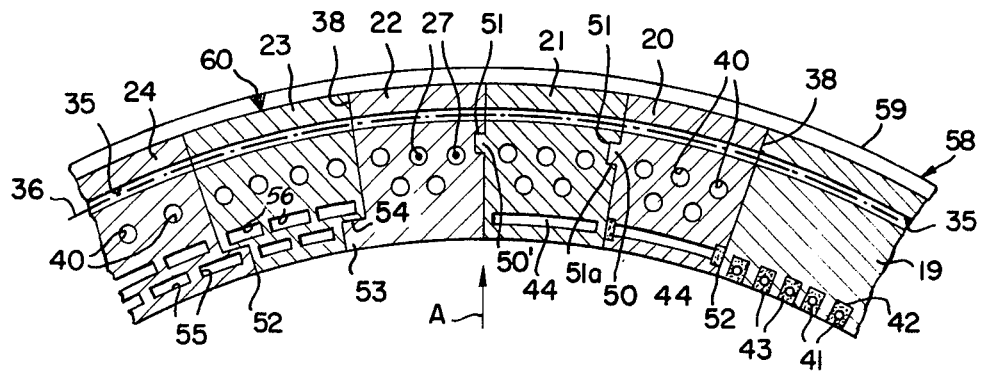
FIG. 2 is a horizontal section through a portion of the wall of the vessel of FIG. 1 along the line II—II, drawn to an enlarged scale.

In the embodiment illustrated in FIGS. 1 and 2, each of the wall elements 17–24 extends the full length of the chamber 33, parallel to the generatrices of the chamber. At the lower end, each of these elements is additionally sealed with respect to the interior of the chamber by a band 34 of hardenable pressure-retentive cement composition of the type described earlier.

While all of the segmental cast-iron elements constituting the wall structure 28 will generally be of the same type, in FIG. 2, there are illustrated a number of different configurations of the cast-iron elements which may be used in combination or independently. All of them are, however, characterized by the presence of an arcuate horizontal channel 35 which is aligned with the corresponding channel of the adjacent cast-iron elements and through which a circular prestressing cable 36 is passed to provide internal prestressing as described earlier. The elements as seen from FIG. 2 are generally of trapezoidal section with flanks 38 which diverge outwardly. The section 19 is shown to be free from the vertical channels 40 through which the rods 27 extend. A corresponding set of rods 41 is, however, provided in channels 42 extending vertically along the inner face of this cast-iron element and in which the rods 41 are anchored by a cementitious composition 43 of the type previously described in connection with the pressure seals.

A modification of this configuration is shown at 20 and 21 in FIG. 2. The cast-iron elements 20 and 21 are formed with arcuate-section channels 44 which extend the full height of the chamber 33 and serve as cooling channels or for conducting a moderating liquid or a fluid designed to restrict diffusion of thermal neutrons through the walls 28 of the chamber 33. Sand-core casting may, of course, be used to form the channels 44 which, as shown in FIG. 1, register with channels 45 formed in the sill 14 of the base plate 12. The vertically extending channels 45 open into a distributing channel 46 for the coolant. At the top of the chamber 33, the channels 44 communicate with vertically extending branches 47 of a channel 48 from which the coolant, moderator or diffusion-limiting fluid is withdrawn for recirculation in the usual manner.

In addition, the elements 20 and 21 are each formed with a trapezoidal array of vertical passages 40 to accommodate the tension rods 27. To prevent passage of high velocity radioactive particles, the laterally adjoining elements 20, 21, etc. are provided with tongue and groove junctions in which the tongue 50 is formed on cast-iron element 20 and the complementary groove 51 is formed on the adjacent element 21. A similar tongue and groove connection is provided at 50′, 51′ between the elements 21 and 22. The tongue and groove formations have flanks 51a, for example, which extend transversely to the radial direction arrow A, at which the radiation is propagated toward the wall. The joints 52 between the elements are sealed with the composition mentioned earlier.

The cast-iron element 22 differs from elements 20 and 21 in that its junction with the adjoining element 23 is of the overlap type. In this arrangement, a ledge 53 extends vertically along the inner face of element 22 and is seated in a recess 54 of corresponding cross section along the inner face of element 23. Here again, passages 40 are provided to accommodate the tension rods 27.

The cooling channels of elements 23 and 24 are shown to be provided in staggered relationship at 55 and 56 in coaxial rows. Passages 46 and 48 in the lower slab and in the upper slab, of course, register with these channels. Passages 40 are also provided to accommodate the tension rods.

As is also apparent from FIGS. 1 and 2, prestress may be applied from the exterior as well. In FIG. 2A, there is represented the prestressing means applied to the lower part of the wall 28 in the form of helical windings 57 of prestressing cable which may be tightened around the structure once it has been assembled to resist the expansion pressures of chamber 33. The turns may be held in place by potting with the epoxy composition mentioned earlier. In addition, or alternatively, prestressing bands 58 are applied in axially spaced relationship along the circumference of wall 28. These bands are composed of sections 59 joined by welding and V-section seams 60 as illustrated in FIG. 2.

At the upper end of the elements 17–24, there are provided the tongues 61 which are received in a circumferential groove 62 formed by the cover slab 31. Sealing is provided by the composition 63 cementing the tongue within the groove and by a band 64 of this composition cementing the gaps or joints between the upper slab and the cast-iron elements 17–24.

Figure 2B:
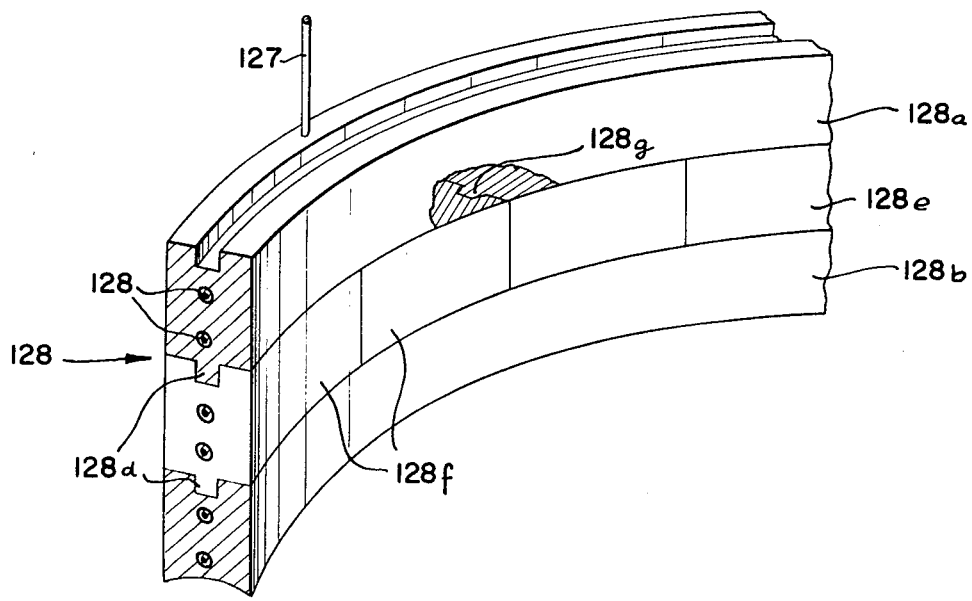
FIG. 2B is a perspective view partly broken away of a portion of a reactor vessel according to another embodiment of the invention.

In FIG. 2B there is shown a modification of this embodiment in which the wall structure 128 is assembled with a plurality of tiers to build up the full height of the chamber. In this case, the cast-iron elements include rings 128a and 128b which are cast in one piece about steel tension cables 128c running in the circumferential direction, these cables becoming effective as the ring expands with increasing temperature. At the joints between the tiers, there are provided tongue and groove connections 128d, the purpose of which has been described previously. Between the cylindrical rings 128a and 128b, there is provided at least one tier 128e made up of cylinder segments 128f laterally interconnected by tongue and groove joints 128g. The tension rods 127 extend vertically through the assembly as described in connection with the rods 27 in FIG. 2.

Figure 4:
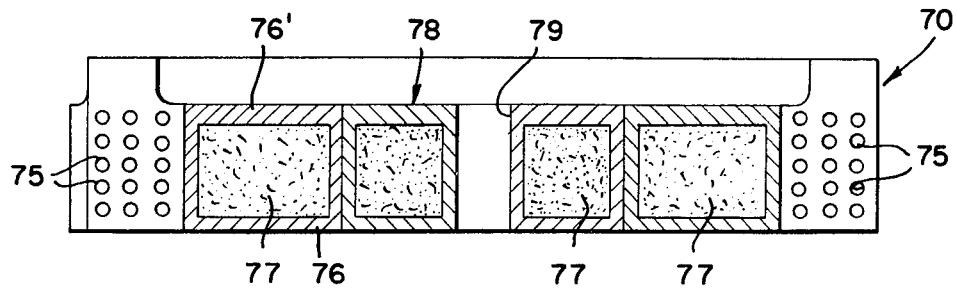
FIG. 4 is a vertical section through the cover slab of the reactor vessel shown in FIG. 3.
Figure 3:
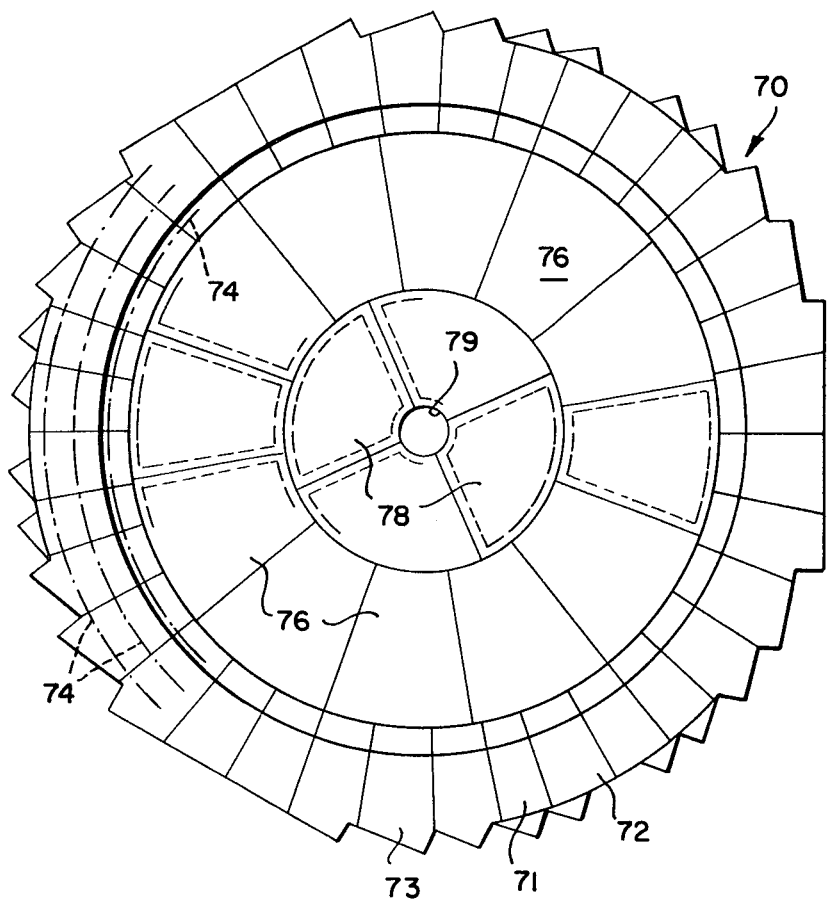
FIG. 3 is a plan view of a modification of the vessel illustrated in FIGS. 1 and 2.

In FIGS. 3 and 4, there is shown an alternative construction of the slab cover 31 of the chamber. The cover 70 illustrated in FIGS. 3 and 4 is composed of a plurality of generally trapezoidal segments 71, 72, 73, etc. held together by circular tension cables 74 extending through passages 75 in the elements 71–73. The outer ring of these elements retains a plurality of sectors 76 shown to have a hollow trapezoidal configuration in FIG. 3 and to be internally filled at 77 with a material such as lead having high shielding capabilities. The upper wall 76' of the sectors 76 is relatively thick, corresponding to the greater stress in this plan when the roof structure is under load. An inner ring 78 of substantially triangular sectors, filled with shielding material and constructed as described for the sector 76, is provided within the ring of the latter sectors but defines an opening 79 through which access to the chamber 33 may be afforded when the opening is unblocked. It will be apparent that this roof construction may also be replaced by one composed of heavily reinforced concrete.

The prestressing of the assembly shown in FIGS. 1–4 is effected by shrinking the rings 58 upon the cylindrical shell 28, the welding of these bands being so arranged that all of the weld seams are formed simultaneously and uniformly from the innermost part outwardly whereby, upon cooling of the weld seam, the contractile or shrinkage force develops. The prestress is increased by the tendency of the vessel to expand with increasing temperature.

The cast-iron parts described above were composed of:

| | Percent by weight |
|---|---|
| Total carbon | 3.60 |
| Silicon | 2.06 |
| Graphitic carbon | 2.93 |
| Combined carbon | 0.68 |
| Phosphorous | 0.20 |
| Manganese | 0.5 |
| Sulfur | 0.06 | the balance being iron.

The embodiments of the invention in which an exclusive property or privilege is claimed are defined as follows:

1. A nuclear reactor comprising a reactor core and a pressure-retentive radiation shielding housing enclosing said core, said housing comprising a base slab, a wall structure mounted on said slab, said wall structure being constituted at least in part of a multiplicity of prestressed cast-iron elements forming structurally supporting and radiation shield means for said reactor, at least some of said elements being formed with internal passages, and prestressing members extending under tension through said passages.

2. The nuclear reactor defined in claim 1 wherein said elements are constituted as cast-iron cylindrical rings.

3. The nuclear reactor defined in claim 1 wherein said elements are constituted of cast-iron cylinder segments.

3. The nuclear reactor defined in claim 1 wherein said elements are substantially abutting at respective joints, further comprising a pressure-retentive cementitious composition sealing said joints.

5. The nuclear reactor defined in claim 1 further comprising interfitting complementary formations on mutually adjacent elements of said wall structure restricting escape of radiation of said housing.

6. The nuclear reactor defined in claim 1 wherein said wall structure is angular, said housing further comprising prestressing means extending under tension aound the exterior of said wall structure.

7. The nuclear reactor defined in claim 6 wherein said prestressing means includes a multiplicity of layers of closely spaced helical turns of prestressing wire coils around said wall structure.

8. The nuclear reactor defined in claim 6 wherein said prestressing means includes a steel band shrunk around said wall structure.

9. The nuclear reactor defined in claim 1 wherein at least some of said elements are formed with channels for conducting a cooling, moderating or diffusion-limiting fluid through said wall structure.

10. The nuclear reactor defined in claim 1 wherein said housing further comprises a roof structure and said slab constitutes a base structure, at least one of said structures being composed at least in part by a plurality of generally segmental hollow members.

11. The nuclear reactor defined in claim 10 wherein said hollow members are filled with radiation-shielding material.

12. A nuclear reactor containment vessel comprising a base slab of a rigid cast material; a generally cylindrical hollow prestressed body mounted on said slab and composed of a plurality of axially extending elongated cast-iron elements forming structurally supporting and radiation shield means for a nuclear reactor core and having laterally interfitting formations; reinforcing means wound around said body for securing said elements against outward movement; a cover slab of cast material overlying said body; and further reinforcing and prestressing members extending under tension through said body and anchored to said slabs for retaining said slabs against said body, said slabs and said body being formed with coolant compartments.

References Cited

UNITED STATES PATENTS

| 1,655,931 | 1/1928 | Langstroth | 220—3 UX |
| 3,228,550 | 1/1966 | Krenzke | 29—446 |
| 3,389,516 | 6/1968 | Ziegler | 176—87 |
| 3,433,382 | 3/1969 | Boggio | 29—446 |
| 3,503,171 | 3/1970 | Frohly | 220—3 |

REUBEN EPSTEIN, Primary Examiner

U.S. Cl. X.R.

29—446; 220—3